United States Patent [19]

Bugg

[11] 4,222,117
[45] Sep. 9, 1980

[54] DATA PULSE RECEIVER ARRANGEMENT

[75] Inventor: Richard E. F. Bugg, Croydon, England

[73] Assignee: U.S. Philips Corporation, New York, N.Y.

[21] Appl. No.: 945,063

[22] Filed: Sep. 22, 1978

[30] Foreign Application Priority Data

May 30, 1978 [GB] United Kingdom .............. 40034/77

[51] Int. Cl.$^2$ .............................................. H04L 7/02
[52] U.S. Cl. ..................... 375/110; 328/223
[58] Field of Search ................. 325/13; 178/68, 88, 178/69.1; 328/120, 164, 155, 223; 331/146, 149, 151, 153, 165, 166, 172, 173, 174

[56] References Cited

U.S. PATENT DOCUMENTS

| 3,246,243 | 4/1966 | Widl | 325/13 |
| 3,349,333 | 10/1967 | Becker et al. | 328/223 |
| 3,439,220 | 4/1969 | Katagiri et al. | 331/166 |
| 3,573,634 | 4/1971 | Rachel | 328/223 |

*Primary Examiner*—Benedict V. Safourek
*Attorney, Agent, or Firm*—Thomas A. Briody; William J. Streeter; Edward W. Goodman

[57] ABSTRACT

A data pulse receiver arrangement is disclosed having a ringing circuit for establishing a clock pulse signal for data pulses which occur in a serial bit stream in a received information signal. The receiver arrangement is characterized in that comparator means are included for comparing the voltage across the ringing circuit with a reference voltage and for actuating a switching means for decoupling the input signal from the ringing circuit to prevent over-excitation thereof.

2 Claims, 5 Drawing Figures

DATA PULSE RECEIVER ARRANGEMENT

BACKGROUND OF THE INVENTION

This invention relates to a data pulse receiver arrangement of a type suitable for the acquisition of data pulses which occur in a serial bit stream in a received information signal in which one level of the signal (say high) represents a binary value '1' and another level (say low) of the signal represents a binary value '0', said arrangement including a data pulse clock generator in the form of a ringing circuit which comprises a tuned circuit arranged for oscillation at a predetermined clock pulse frequency and voltage-to-current convertor means responsive to voltage input pulses derived from received data pulses to produce current pulses for exciting the tuned circuit to maintain its oscillation.

A data pulse receiver arrangement of the above type has application in data transmission systems in which data transmission and reception is not synchronised, so that for data reception a data pulse clock has to be derived from the received data pulses. Such a data transmission system is, for example, the BBC/IBA Teletext television transmission system in which coded data pulses representing alpha-numeric text or other message information are transmitted in a video signal in at least one television line in field-blanking intervals where no picture signals representing normal picture information are present. United Kingdom patent specification No. 1,370,535 discloses this form of television transmission system, and the use of a data pulse receiver arrangement of the above type has already been proposed for generating a data pulse clock in a television receiver arrangement thereof.

However, in a received information signal, a succession of '1' data pulses and likewise a succession of '0' data pulses would cause the information signal to remain at one level, (e.g. high or low as the case may be) for the duration of such a succession of data pulses. This situation can give rise to difficulty in the reception and acquisition of the data pulses. Another situation that can give rise to difficulty is one in which the change in the level of the information signal is too frequent due to the reception of a relatively long series of alternate '1' and '0' data pulses. These difficulties arise from the use as the data pulse clock generator of a ringing circuit which oscillates at the desired clock frequency and which is excited to maintain its oscillation each time there is a change in the level of the information signal. Thus, if the change in level of the information signal is too frequent there is a possibility of over-exciting the ringing circuit so that the tuned circuit of the ringing circuit is distorted and its Q is reduced. On the other hand, if the change in level of the information signal is too infrequent there is then the possibility that oscillatory output of the ringing circuit is progressively damped.

SUMMARY OF THE INVENTION

It is an object of the present invention to provide a data pulse receiver arrangement of the type referred to which has an improved ringing circuit whereby the aforesaid possibilities of over -or under- excitation thereof are mitigated, so that the ringing circuit is eminently suitable for use as a data pulse clock generator.

According to the invention a data pulse receiver arrangement of the type referred to is characterized in that said ringing circuit comprises comparator means for comparing the voltage produced across the tuned circuit with a reference voltage, and switching means responsive to an output received from the comparator means when the voltage across the tuned circuit exceeds the reference voltage to interrupt the current pulses to the tuned circuit until said output from the comparator has been terminated due to oscillation damping of the tuned circuit reducing the voltage across it to below the reference voltage again.

There is thus provided in the data pulse receiver arrangement a ringing circuit with a form of servoing or regulation which tends to prevent over-excitation of the tuned circuit. This produces low-distortion well-defined amplitude control without affecting the Q of the tuned circuit, and the ringing circuit can be designed to allow for the lowest excitation condition which is likely to occur in operation.

In a particular embodiment of the invention the ringing circuit may comprise first and second transistors which are connected as a long-tailed pair and form said comparator means, a third transistor which is connected in the common emitter connection of the first and second transistors and forms said voltage-to-current convertor means, and a fourth transistor which forms said switching means and is connected as an emitter-follower to apply the voltage produced across the tuned circuit to the base of either said first or second transistor of which said reference voltage is applied to the base of the other. This embodiment has the advantage that the long-tailed pair affords accurate switching of current into and away from the tuned circuit, as determined by the relative values of the reference voltage and the voltage across the tuned circuit.

DESCRIPTION OF THE DRAWINGS

In order that the invention may be more fully understood, reference will now be made, by way of example, to the drawing filed with the Provisional Specification and to the accompanying drawing. In the drawings:

FIG. 4 shows a block diagram of a data pulse receiver arrangement of the type referred to.

DESCRIPTION OF THE PREFERRED EMBODIMENT

Figure 1:
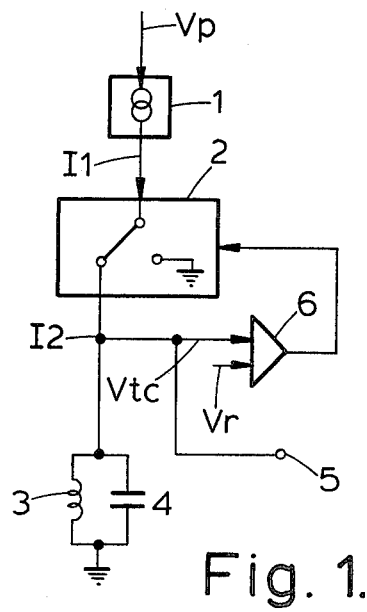
FIG. 1 shows a simplified form of ringing circuit for carrying the invention into effect.
Figure 5:
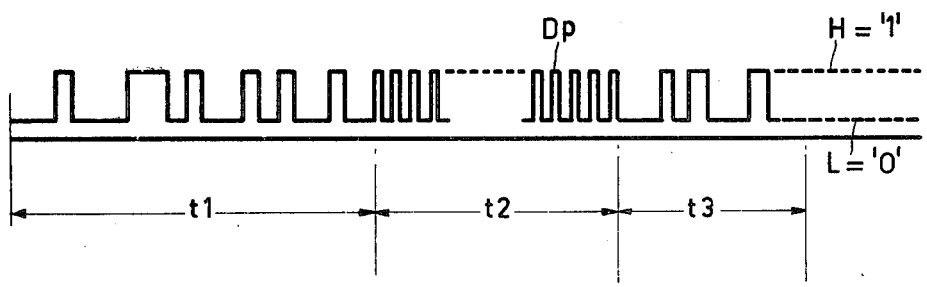
FIG. 5 shows diagrammatically a data signal comprised by data pulses.

Referring to the drawings, the ringing circuit shown in FIG. 1 comprises a voltage-to-current convertor 1 to which voltage pulses Vp are applied. These voltage pulses Vp are of short duration, relative to a clock pulse period of the clock pulse frequency to be produced by the ringing circuit, and are derived, for instance, from each change in level of an information signal (such as shown in FIG. 5) composed of binary '1' (high level) and binary '0' (low level) data pulses. In response to the voltage pulses Vp the convertor 1 produces drive current pulses I1 which are applied via a switching circuit 2 to a tuned circuit comprising a coil 3 and a capacitor. The drive current at the output of the switching circuit 2 is designated I2 and it equals I1 when the voltage Vtc across the tuned circuit 3, 4, due to its excitation by the drive current I2, has a peak value which does not exceed a reference voltage Vr.

Figure 2:
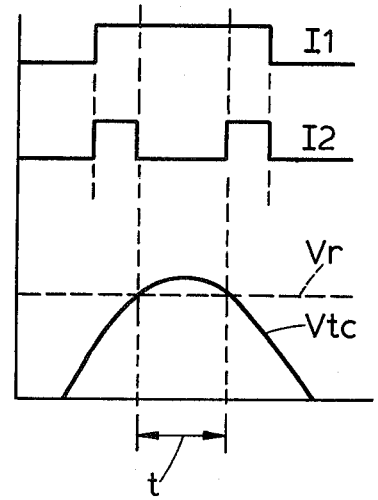
FIG. 2 shows wave-form diagrams which are illustrative of the operation of the ringing circuit of FIG. 1.

The voltage Vtc appears at an output terminal 5 from which it can be extracted for limiting and shaping to form the required data pulse clock. The voltage Vtc and the reference voltage Vr are applied to a comparator 6. When the voltage Vtc exceeds the voltage Vr, the comparator 6 produces an output which causes the switching circuit 2 to operate and divert the current I1 to earth. The effect of this is seen in FIG. 2. While the voltage Vtc across the tuned circuit 3, 4 is greater than the reference voltage Vr, that is for the period t in FIG. 2, the current I2 is cut-off, because the current I1 is diverted to ground by the switching circuit 2. The voltages Vtc and Vr could, of course, be reversed in polarity.

Figure 3:
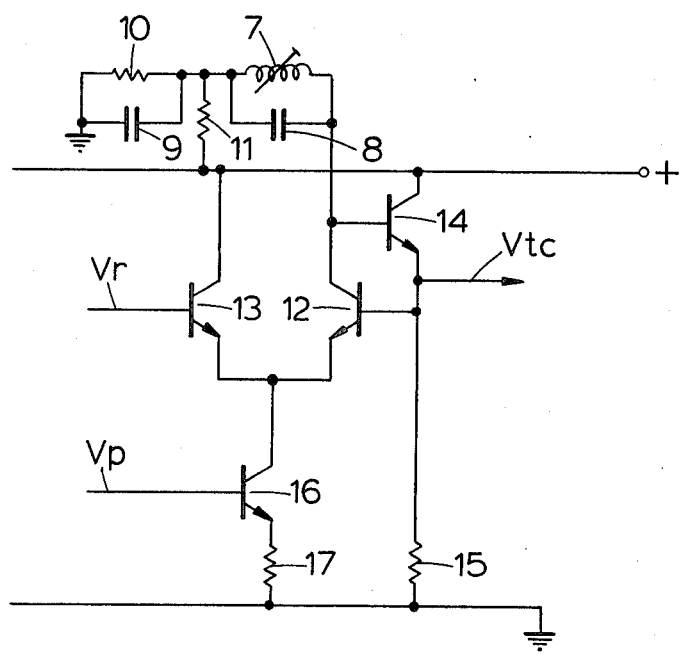
FIG. 3 shows a more detailed realization of a ringing circuit for carrying the invention into affect.

The more detailed ringing circuit shown in FIG. 3 comprises a tuned circuit composed of a pre-set coil 7, two capacitors 8 and 9 and two resistors 10 and 11 all connected as shown between ground and a positive supply line (+). A long-tailed pair composed of transistors 12 and 13 respectively feed drive current to, and divert drive current from, the tuned circuit. The conduction of transistor 13 is controlled by the reference voltage Vr which is applied to its base, and the conduction of transistor 12 is controlled by the voltage Vtc across the tuned circuit, the voltage Vtc being applied to the base of transistor 12 via a transistor 14 which is connected as an emitter follower with its emitter-collector path in series with a resistor 15 between the positive supply line (+) and ground. The voltage at the junction of resistors 10 and 11 must be greater than the reference voltage Vr plus the Vbe of transistor 14. The output voltage from the ringing circuit is taken from the emitter of transistor 14. A transistor 16 has its emitter-collector path connected in series with a resistor 17 between ground and the commoned emitters of the two transistors 12 and 13. The transistor 16 has the voltage pulses Vp applied to its base and operates as a current source.

Figure 4:
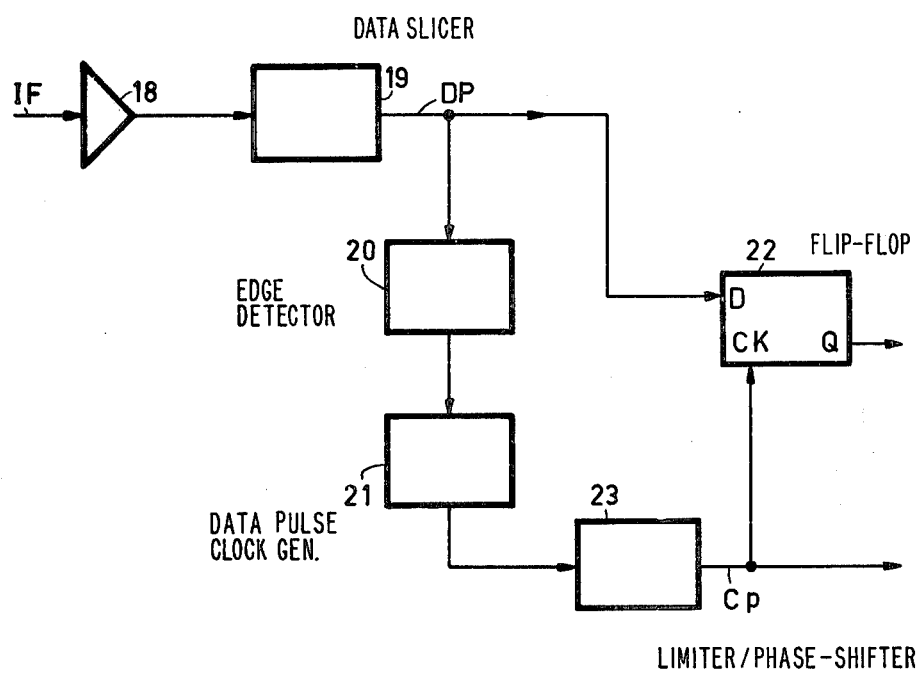

The block diagram of a data pulse receiver arrangement shown in FIG. 4 comprises an input amplifier 18, a data slicer 19, an edge detector 20, a data pulse clock generator 21, and a flip-flop 22. An information signal IF applied to the input amplifier 18 is fed after amplification to the data slicer 19 which is operable to determine a data slicing level for the information signal IF. Such data slicers are well-known in the art, one form being disclosed in our co-pending United Kingdom patent application No. 16109/77 (PHB.32577). The data pulse output Dp from the data slicer 19 is applied to the D-input of the flip-flop 22 and also to the edge detector 20. The latter, which may be a differentiating circuit, is operable to apply a voltage pulse to the data pulse clock generator 21 for each data edge in the data pulse output Dp from the data slicer 19. The data pulse clock generator 21 is formed in accordance with the invention and produces clock pulses Cp which are applied (after suitable limiting and phase-shifting by means 23) to the clock input CK of the flip-flop 22. The flip-flop 22 thus produces a data output signal at its Q-output. The data signal shown in FIG. 5 may be assumed to be the data pulse output Dp from the data slicer 19. This data signal has a high level 'H' which represents the binary value '1' and a low level 'L' which represents the binary value '0'. During periods of t1 and t3, there is a fairly average amount of '1' and '0' data pulses so that the generator 21 will function normally. However, for the period t2 the ringing circuit of the generator 21 would tend to become over-excited due to the predominance of data pulse transitions, without the use of the invention.

I claim:

1. A data pulse receiver arrangement for the acquisition of data pulses which occur in a serial bit stream in a received information signal in which one level of the signal represents a binary value '1' and another level of the signal represents a binary value '0', said arrangement including a data pulse clock generator in the form of a ringing circuit which comprises a tuned circuit arranged for oscillation at a predetermined clock pulse frequency and voltage-to-current convertor means responsive to voltage input pulses derived from received data pulses to produce current pulses for exciting the tuned circuit to maintain its oscillation, which data pulse receiver arrangement is characterized in that said ringing circuit further comprises comparator means for comparing the voltage produced across the tuned circuit with a reference voltage, and switching means responsive to an output received from the comparator means when the voltage across the tuned circuit exceeds the reference voltage to interrupt the current pulses to the tuned circuit until said output from the comparator has been terminated due to oscillation damping of the tuned circuit reducing the voltage across it to below the reference voltage again.

2. A data pulse receiver arrangement as claimed in claim 1, wherein said ringing circuit comprises first and second transistors which are connected as a long-tailed pair and form said comparator means, a third transistor which is connected in the common emitter connection of the first and second transistors and forms said voltage-to-current convertor means, and a fourth transistor which forms said switching means and is connected as an emitter-follower to apply the voltage produced across the tuned circuit to the base of either said first or second transistor of which said reference voltage is applied to the base of the other.

* * * * *

UNITED STATES PATENT AND TRADEMARK OFFICE
CERTIFICATE OF CORRECTION

PATENT NO. : 4,222,117
DATED : September 9, 1980
INVENTOR(S) : RICHARD E.F. BUGG It is certified that error appears in the above—identified patent and that said Letters Patent is hereby corrected as shown below:

On The Title Page,

In the Foreign Application Priority Data section

Please add:

-- 9/26/77 [GB] United Kingdom 40034/77 --

*Signed and Sealed this*

*Ninth* Day of *November 1982*

[SEAL]

Attest:

GERALD J. MOSSINGHOFF

*Attesting Officer*     *Commissioner of Patents and Trademarks*